United States Patent [19]

Morioka

[11] Patent Number: 5,317,412
[45] Date of Patent: May 31, 1994

[54] VIDEO TAPE RECORDER FOR RECORDING AND REPRODUCING HIGH-DEFINITION VIDEO SIGNAL AND AUDIO SIGNAL

[75] Inventor: Yoshihiro Morioka, Neyagawa, Japan

[73] Assignee: Matsushita Electric Industrial Co., Ltd., Osaka, Japan

[21] Appl. No.: 922,147

[22] Filed: Jul. 30, 1992

[30] Foreign Application Priority Data

Jul. 31, 1991 [JP] Japan .................. 3-191605

[51] Int. Cl.$^5$ .................. H04N 5/782; H04N 9/79
[52] U.S. Cl. .................. 358/310; 358/311; 358/343; 360/19.1
[58] Field of Search .............. 358/310, 341, 343, 328, 358/311; 360/19.1, 33.1, 35.1, 64, 10.1; 369/97; H04N 9/79

[56] References Cited
U.S. PATENT DOCUMENTS

| | | | |
|---|---|---|---|
| 4,517,609 | 5/1985 | Yoshihiko | 360/19.1 |
| 4,547,816 | 10/1985 | Sochor | 358/343 |
| 4,672,467 | 6/1987 | Heitmann | 358/310 |
| 4,751,590 | 6/1988 | Wilkinson | 360/19.1 |
| 4,785,358 | 11/1988 | Ninomiya | 358/335 |
| 4,799,111 | 1/1989 | Ito | 360/19.1 |
| 4,905,104 | 2/1990 | Okamoto et al. | 360/32 |
| 4,910,605 | 3/1990 | Sasaki et al. | 358/310 |
| 5,115,323 | 5/1992 | Tachibana et al. | 358/310 |
| 5,138,500 | 8/1992 | Haikawa et al. | 358/341 |

Primary Examiner—Tommy P. Chin
Assistant Examiner—Huy Nguyen
Attorney, Agent, or Firm—Ratner & Prestia

[57] ABSTRACT

In a helical scan type magnetic recording/reproducing apparatus in which a magnetic tape is wound on a rotary cylinder through about 350° for recording/reproducing each of the component color video signals, two magnetic heads in a reverse azimuth relation to each other are provided in a symmetrical relation at 180° on the rotary cylinder having a diameter half that of a conventional rotary cylinder, with the cylinder being adapted to make two rotations during one field period of the color video signal. By selecting input/output timings of four memories at a predetermined rate to be determined by a specific rule, strongly correlated video signal is disposed in the tracks neighboring the track recorded with video signal so as to obtained high reproducing S/N ratio. As a result, magnetic head attachment and positioning for a two channel two segment video tape recorder are simplified at high accuracy, while by the reduction of the rotary cylinder to half the conventional size, the apparatus can be made very compact in size. Furthermore, by employing two magnetic heads for the recording and reproduction of the video signal and audio signal, the apparatus can be used in a plurality of recording and reproducing modes e.g. at the standard mode and long time mode.

10 Claims, 5 Drawing Sheets

Fig. 3

| | | | | | | |
|---|---|---|---|---|---|---|
| A | $Y_1$ | $(R-Y)_1$ | $Y_5$ | $(B-Y)_5$ | $Y_9$ | $(R-Y)_9$ |
| B | $Y_2$ | $(R-Y)_2$ | $Y_6$ | $(B-Y)_6$ | $Y_{10}$ | $(R-Y)_{10}$ |
| C | $Y_3$ | $(R-Y)_3$ | $Y_7$ | $(B-Y)_7$ | $Y_{11}$ | $(R-Y)_{11}$ |
| D | $Y_4$ | $(R-Y)_4$ | $Y_8$ | $(B-Y)_8$ | $Y_{12}$ | $(R-Y)_{12}$ |

Fig. 5

VIDEO TAPE RECORDER FOR RECORDING AND REPRODUCING HIGH-DEFINITION VIDEO SIGNAL AND AUDIO SIGNAL

BACKGROUND OF THE INVENTION

The present invention generally relates to a video tape recorder (VTR), and more particularly, to a video tape recorder for recording and reproducing high-definition color video signals and audio signals of a high-definition television, CATV or the like, on a magnetic recording medium such as a magnetic tape, etc.

Conventionally, as the video tape recorders for recording component color video signals on magnetic tapes, there have been well-known video tape recorders for a broadcasting or business applications such as those of "M2 system" or "beta-cam" system, etc. Such video tape recorders are arranged to record and reproduce signals of two channels by using magnetic heads of two channels, and disclosed, for example, in Japanese Patent Laid-Open Publications Tokkaisho Nos. 59-4279, 59-34785, 58-131885, 59-104886, and 59-104887, etc.

In these video tape recorders as ref erred to above, the magnetic heads of two channels consist of two head pairs. The mounting positions for one head pair and for the other head pair are in a symmetrical relation at 180° with respect to the rotational center of a rotary cylinder, while in each one head pair, the two heads are mounted close to each other.

One example of a typical conventional two channel video tape recorder is shown in an article "A ½ inch metal cassette system" by S. Matsuda et al. in Technical Report of the Institute of Television Engineers of Japan, Vol. 9, No. 2 (May, 1985), pages 19 to 20.

Meanwhile, up to the present, in the attempts of investigations and developments for the purpose of applications of high-definition television video signals into domestic use video tape recorders, studies on recording and reproducing in the form of MUSE signals which are the compression signals of the high-definition television signals proposed by NHK, Japan, were made at the early stage thereof. These are of the recording systems disclosed, for example, in a national Conference, No. 7-16 in 1987, Technical Report of the Institute of Television Engineers of Japan, Report of video recording study meeting of the Institute of Television Engineers of Japan VR 88-4, pages 19 to 24, Jan. 27, 1988. Moreover, as a business use video tape recorder for recording the high-definition television base band signals, there is proposed the video tape recorder called UNI-HI, and referred to in an article "½ inch cassette video tape recorder for base band high-definition television signal recording" by S. Sasaki et al., IEEE, Transactions on Broadcasting, Vol. 35, No. 4, December 1989, pages 348 to 356, etc. Furthermore, as a domestic use video tape recorder for effecting recording of the high-definition television base band signal, there is proposed an article "High-definition television video tape recorder specification for public use" by Yamashita et al., Technical report of the Institute of Television Engineers of Japan, Vol. 15, No. 50, pages 1–6, 1991.

In the known component color video signal recording video tape recorder as described above, and having a two-channel staggered construction, there are complicated procedures for mounting and precise positioning of four magnetic heads in order to achieve interchangeability. Moreover, there has been such a problem that for employing a plurality of recording and reproducing modes such as a standard mode and a long time mode, etc., the number of magnetic heads must be doubled to eight, thus complicating the arrangement to a large extent. Another serious problem is such that, if the diameter of a cylinder is left as it is in the conventional construction, size reduction of the apparatus is undesirably limited, and it becomes difficult to apply the arrangement to a compact video camera and the like.

Additionally, in the video tape recorder arranged to record and reproduce MUSE signal which is the analog sample value, a large scale circuit is required for the processing of complicated signals therefor. Moreover, in the video tape recorder, since there is a time axis variation, noises are repeatedly produced by jitters, different from the satellite communication in which a pure transmission path may be employed, thus resulting in a large deterioration in the quality of reproduced images. Furthermore, when a solid writing without guard bands is effected for a high density recording in the video tape recorder, a serious problem such as image deterioration may take place due to errors in the detection of movement of the MUSE signal by a reproduction cross-talk interference in neighboring tracks.

SUMMARY OF THE INVENTION

Accordingly, an essential object of the present invention is to provide a video tape recorder for recording and reproducing high-definition video signal and audio signal arranged to record a high-definition video signal, i.e. a high-definition color video signal by a base band, and simultaneously, to also record four channel PCM audio signal, wherein two magnetic heads are provided for simplified mechanism, with a winding angle of the magnetic tape onto a rotary cylinder being set at about 350° for reduction of a cylinder system size to half that in the conventional arrangement for application, for example, to a very small-sized one unit type camera video tape recorder, while by an azimuth recording, sufficient recording and reproducing time is available in a state without the guard band and at high recording density, with further advantages that, since the recording track patterns of the two magnetic heads become symmetrical even with respect to different tape feeding speeds, the provided two magnetic heads can be commonly used not only for the standard mode, but for the long time mode, without necessity of newly adding magnetic heads.

Another object of the present invention is to provide a video tape recorder of the above described type which is simple in construction and stable in functioning, and readily manufactured at low cost.

In accomplishing these and other object, according to the present invention, in a helical scan type magnetic recording/reproducing apparatus arranged to record/reproduce each of the component color video signals, two magnetic heads in a reverse azimuth relation to each other are disposed on a rotary cylinder in a symmetrical relation at 180°, while the rotary cylinder is rotated by two rotations during the one field period of said color video signal. Moreover, when recording and reproducing may be effected by the long image mode, the tape feeding speed is reduced to ½ or ⅓ or to 1/N, with N being set as an integer. Here, by winding the magnetic tape around the rotary cylinder through about 350°, the cylinder diameter may be reduced to half the conventional arrangement.

Furthermore, by properly adjusting the signal recording timing, exactly the same recording track pattern as the recording track pattern recorded by the conventional rotary cylinder can be formed. For example, the same recording track pattern as that recorded by four magnetic heads provided on a rotary cylinder of 62 mm in diameter making 60 rotations per one second in synchronization with the high-definition video signal, can be obtained. Such recording pattern is one in which video signal and audio signal of a video tape recorder called UNI-HI or M2, etc. are recorded.

Moreover, for the signal recording pattern on the magnetic tape, an input/output timing control of memory is effected so that the signal strongly correlated to each other is disposed for the neighboring track in the video signal.

According to one preferred embodiment of the present invention, there is provided a high-definition color video signal and audio signal magnetic recording/reproducing apparatus for recording/reproducing each of high-definition color video signal and audio signal on a magnetic recording/reproducing medium, which includes a memory means for dividing each of said high-definition color video signal and audio signal into four memory parts to be memorized, a rotary cylinder drive circuit for rotating a rotary cylinder wound with the magnetic recording/reproducing medium through about 350°, by two rotations per each one field of said high-definition color video signal, with the rotary cylinder being provided with two magnetic heads mounted in a symmetrical relation with respect to its rotational center, and a switcher means for supplying said high-definition color video signal and said audio signal each stored in said four memory parts, to said two magnetic heads on said rotary cylinder respectively through change-over, whereby each of said high-definition color video signal and said audio signal are arranged to be recorded and reproduced on said magnetic recording and reproducing medium by four tracks during said one field period.

By the above arrangement, the cylinder diameter may be reduced to half that in the conventional arrangements, although the video tape recorder is intended to record and reproduce the high-definition video signal and PCM audio signal, and thus, the appliance may be formed into a very compact size for application to the one unit type camera video movie, etc. Furthermore, since the required number of magnetic heads may be reduced to half, i.e. to two heads, the magnetic head construction becomes very simple for facilitation of mounting work, while it is made possible to realize the recording and reproducing in the plurality of modes, i.e. the standard mode and the long time mode, etc.

BRIEF DESCRIPTION OF THE DRAWINGS

These and other objects and features of the present invention will become apparent from the following description taken in conjunction with the preferred embodiment thereof with reference to the accompanying drawings, in which;

FIG. 3 is a diagram for explaining one example of component video signals to be inputted and outputted, FIG. 5 is a diagram for explaining one example of a recording pattern.

DETAILED DESCRIPTION OF THE INVENTION

Figure 1:
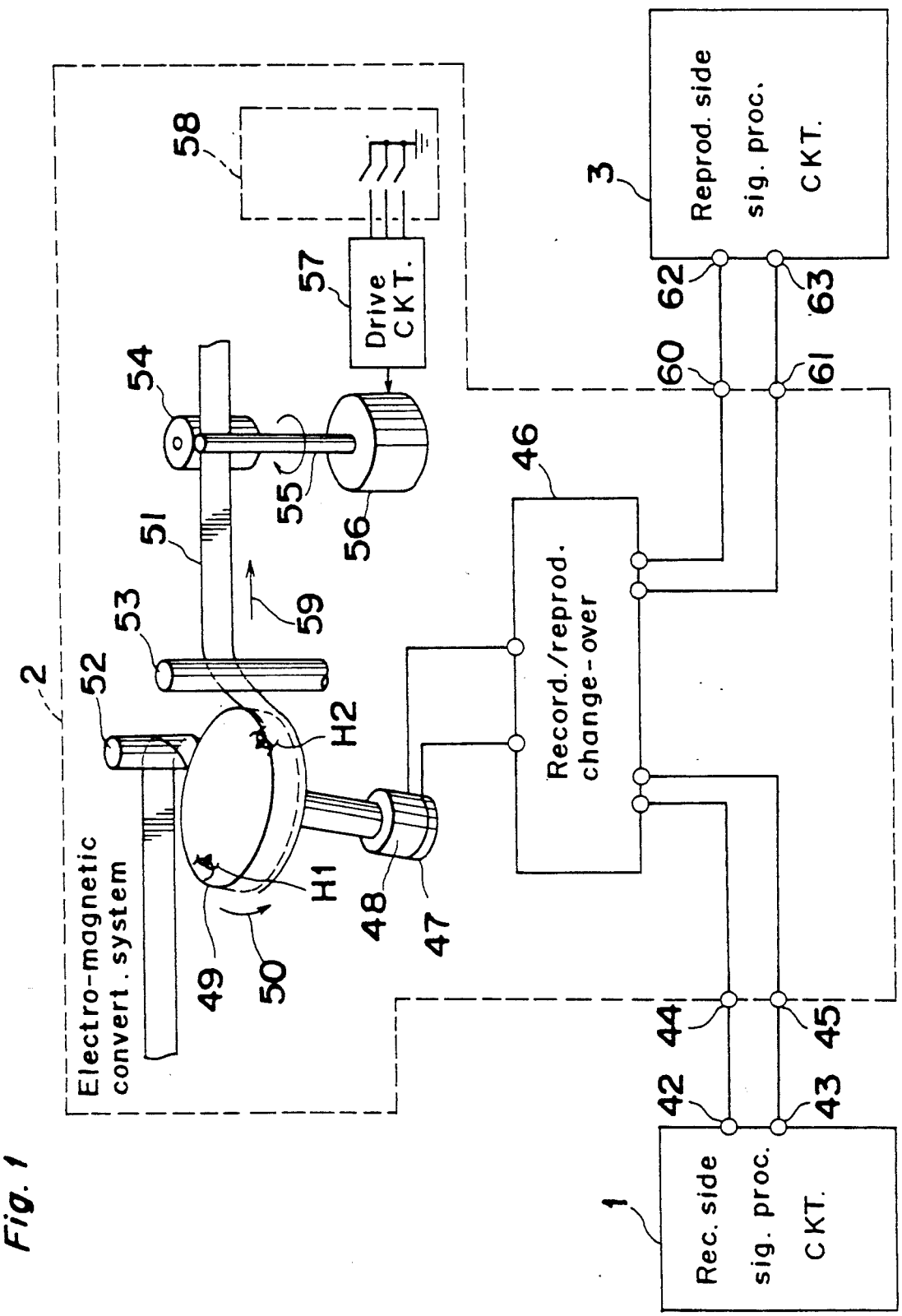
FIG. 1 is a schematic block diagram showing an essential portion of a video tape recorder for recording and reproducing high-definition color video signals and audio signals according to one preferred embodiment of the present invention.

Before the description of the present invention proceeds, it is to be noted that like parts are designated by like reference numerals throughout the accompanying drawings.

Referring now to the drawings, there is shown in FIG. 1, a schematic block diagram representing essential portions of a video tape recorder for recording and reproducing high-definition video signal and audio signal according to one preferred embodiment of the present invention, which generally includes a recording side signal processing circuit 1 and a reproducing side signal processing circuit 3 coupled with an electromagnetic conversion system 2 as illustrated.

Figure 2:
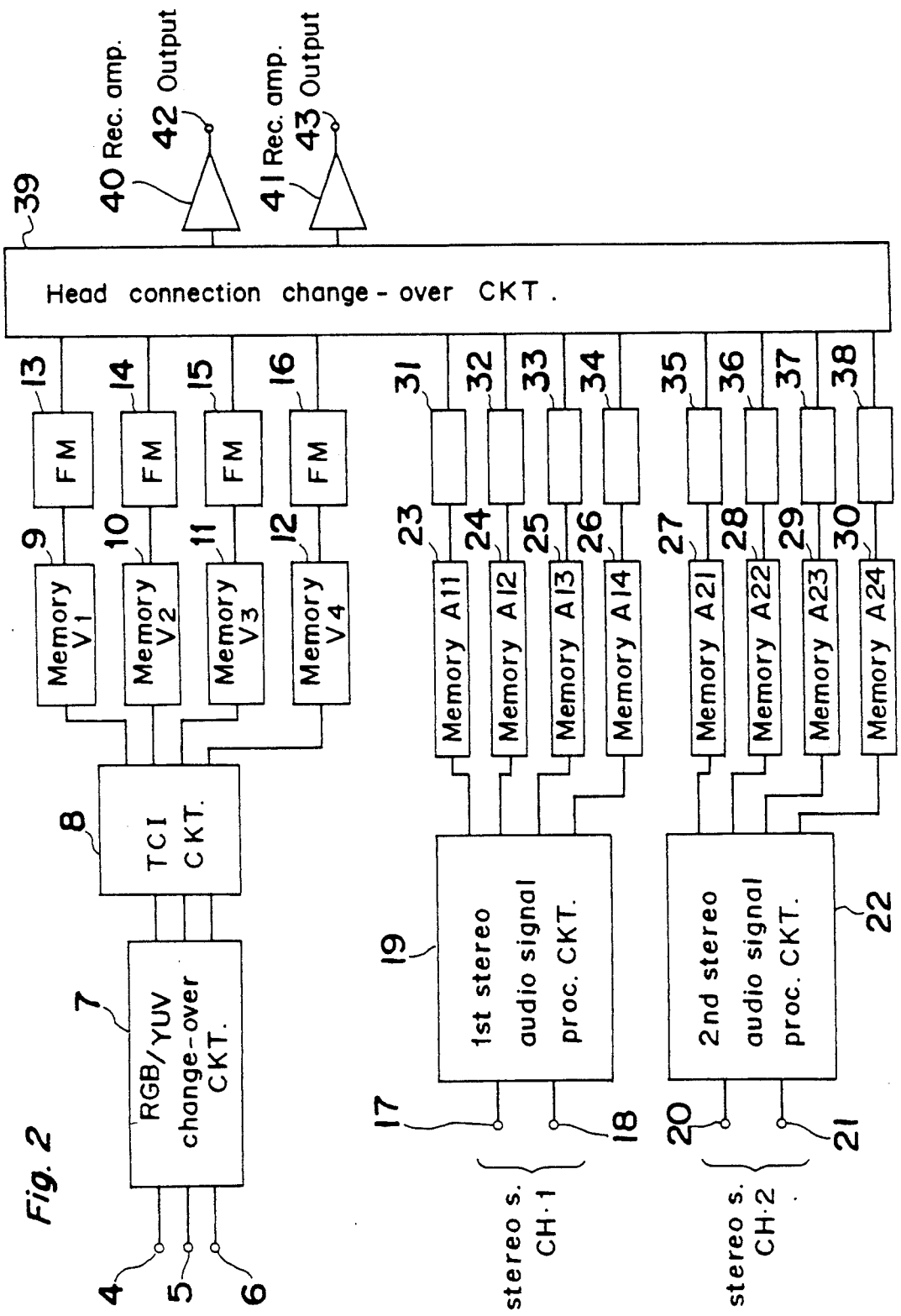
FIG. 2 is a block diagram showing one example of an internal construction of a recording side signal control circuit referred to in FIG. 1.

In FIG. 2, there is shown one example of an internal construction of the recording side signal processing circuit 1 referred to above.

In the arrangement of FIG. 2, color signals R, G and B which are the three primary color signals from a CCD video camera, etc. (not shown) are inputted to input terminals 4, 5 and 6 which are coupled with a head connection change-over circuit 39 through an RGB/YUV conversion circuit 7, a time axis expansion /compression circuit 8, memory circuits 9, 10, 11 and 12, and frequency modulation circuits 13, 14, 15 and 16. The R, G and B signals applied to the input terminals 4, 5 and 6 are converted by the RGB/YUV conversion circuit 7, into a luminance signal Y and two color difference signals $U=B-Y$ and $V=R-Y$. Then, these signals are inputted to the time axis expansion/compression circuit 8, and respectively formed into video signals (TDM video signals) in which luminance signals and color difference signals are subjected to time axis expansion/compression as shown in A, B, C and D in FIG. 3. These TDM video signals A, B, C and D may be obtained by a conventional signal processing through employment of a memory means as disclosed, for example, in Japanese Patent Laid-Open Publication Tokkaisho No. 62-249590. The four TDM video signals A, B, C and D as referred to above are subjected to frequency modulation so as to be converted into a proper level by the frequency modification circuits 13, 14, 15 and 16 after having been retained in the memory circuits 9, 10 and 11 and 12 in FIG. 2 for a predetermined period of time, and then, applied to the head connection change-over circuit 39.

Meanwhile, for stereophonic audio signals, input terminals of two systems are provided. More specifically, from the input terminals 17 and 18, the signals are respectively inputted to a first stereo audio signal processing circuit 19 for the audio channel 1. Similarly, from the input terminals 20 and 21, the signals are inputted to a second stereo audio signal processing circuit 22. In each of the two PCM signal processing circuits 19 and 22, the audio signal is sampled at 32 kHz, and digital signal of 16 bits are converted into that of 12 bits, while interleave processing and addition of error correction signal, etc. are effected. Such a series of signal processing is that well known up to the present. Thus, the PCM signals subjected to the signal processing are applied to the memory circuits 23, 24, 25 and 26, and 27, 28, 29 and 30 in the two systems respectively, and after having been retained in these memory circuits for a predetermined period of time, subjected to digital modulation by digital signal modulation circuits 31, 32, 33 and 34, and 35, 36, 37 and 38 to be converted into a proper level, and thereafter, inputted into the head connection change-over circuit 39. Here, although the audio signals are set to be in four channels, since the same recording capacity is obtained by two channel audio signals of 16 bits at 48 kHz sampling, such signals may be employed for the recording.

Figure 4:
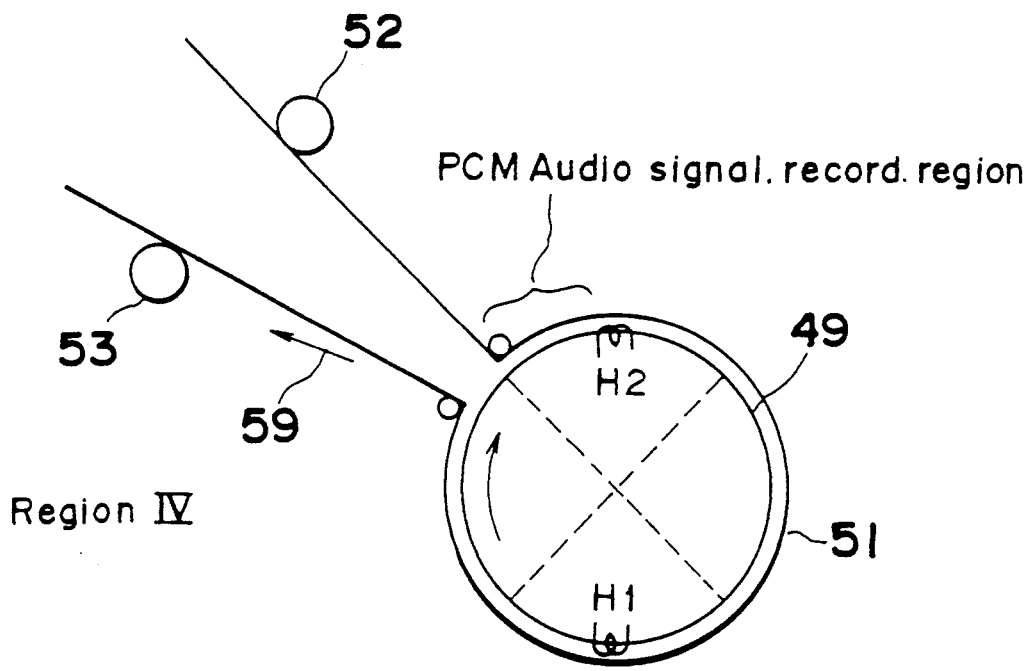
FIG. 4 is a diagram for explaining connection of magnetic heads held in contact with the magnetic tape and the signal processing circuit.

In the head connection change-over circuit 39, the video signals A, B and C, and the PCM audio signals are changed-over by the method shown in FIG. 4 and Table 1 to be given below, and through recording amplifiers 40 and 41 and output terminals 42 and 43, applied to input terminals 44 and 45 of the electromagnetic converting system 2 (FIG. 1).

Table 1 below is intended to explain the connection between the two magnetic heads in contact with the magnetic tape and the signal processing circuit.

maintaining a similar figure. More specifically, in the case where relative heights of the two magnetic heads are the same, the recording track widths by the two magnetic heads are also the same even if the tape feeding speed is varied arbitrarily. As described above, by winding the magnetic tape around the rotary cylinder by about 350°, it becomes possible to achieve interchangeability with the conventional recording track by reducing the cylinder diameter.

Since the two magnetic heads H1 and H2 are contacting the magnetic tape by the amount equivalent to 350° in the amount for 360°, i.e. contacting the magnetic tape almost at all times, the PCM audio signal and TDM video signal applied to the two magnetic heads H1 and H2 are varied in turn as shown in Table. 1.

Figure 5:
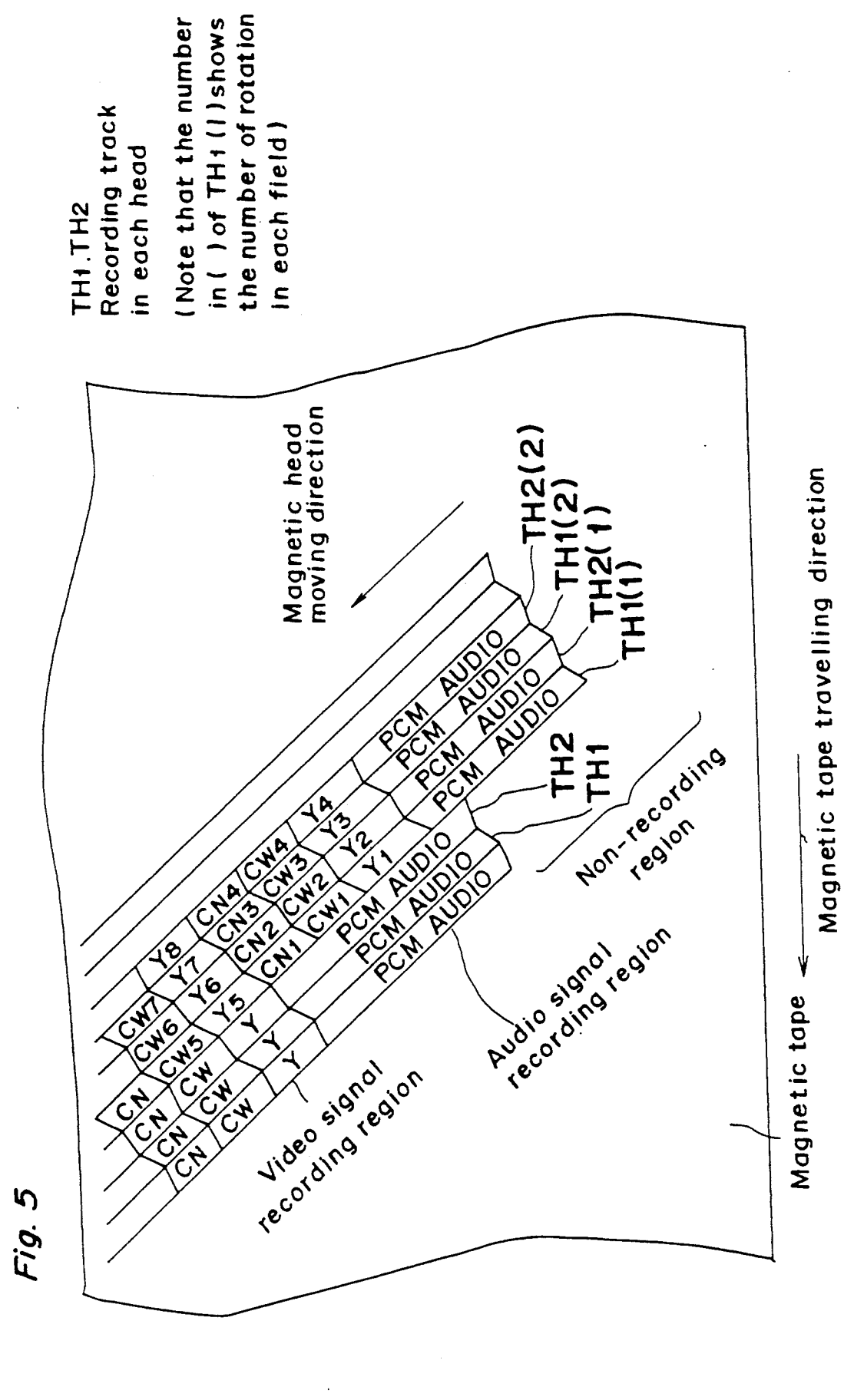

One example of the recording pattern recorded in the above described manner is shown in FIG. 5. As is seen from FIG. 5, with respect to the video signal, by effectively utilizing the memory when the TDM video signal is formed, the correlation between the signals recorded on the neighboring tracks may be readily achieved. Therefore, in this case, by the theory of triangular noise with respect to the video signal subjected to FM re-

TABLE 1

| | Kinds of audio and video signals inputted to each head | | | | | |
|---|---|---|---|---|---|---|
| | 1 field period (cylinder two rotations) | | 1' field period (cylinder two rotations) | | | |
| Head H1 | Rec. contents of memory A11, A21 and V1 | Rec. contents of memory A13, A23 and V3 | Rec. contents of memory A11, A21 and V1 | | — — — | — — — |
| Head H2 | | Rec. contents of memory A12, A22 and V2 | Rec. contents of memory A14, A24 and V4 | | — — — | — — — |

Hatched line portions: Non-recording time

Time ———>

In the case of the recording mode, these input signals are inputted to two magnetic heads H1 and H2 through two channel rotary transformers 47 and 48 from the recording/reproducing change-over switch 46 (FIG. 1). These two magnetic heads H1 and H2 are disposed on a rotary cylinder 49 having a diameter of 31 mm which is half the diameter of the conventional rotary cylinder, in a symmetrical relation at 180°, and are in a relation of reverse azimuth to each other. Since the rotary cylinder 49 is adapted to make two rotations during one field period of the color video signal, four recording tracks are formed during one field period. In this case, by properly selecting timings for writing and reading of the memory means described earlier, it becomes possible to achieve coincidence with the recording track pattern formed by four magnetic heads on the conventional cylinder of 62 mm.

Here, the region in which the video signal and the audio signal are recorded is somewhat smaller than the region recorded by the conventional rotary cylinder. The difference in the regions as described above is the recording area of another PCM audio signal in the conventional rotary cylinder.

Meanwhile, in the case where recording and reproducing can be made by the long time mode, the tape feeding speed is made slower than in the standard mode. In this case, the recording track pattern is varied, while cording, SN ratio during the reproduction may be improved.

In the arrangement of FIG. 1, the rotary cylinder 49 rotated in the direction indicated by an arrow 50 is wound with the magnetic tape 51 which is supported by posts 52 and 53 and fed in a direction indicated by an arrow 59, with a pinch roller 54, a capstan 55 and a capstan motor 56, etc. being provided along the path of the magnetic tape 51 in a known manner. The capstan motor 56 is driven by a drive circuit 57, and the rotational speed of said motor 56 is variable by an operating mode selecting switch circuit 58.

Meanwhile, during reproduction, the signal recorded on the magnetic tape 51 is reproduced in the process opposite to that during the recording, thereby to obtain the original video signal and audio signal. In other words, in the reproducing mode, the reproducing signal of the two magnetic heads H1 and H2 are outputted to output terminals 60 and 61 from the recording/reproducing change-over switch 46 through the two channel rotary transformers 47 and 48. These signals are inputted to the reproducing side signal processing circuit 3 through input terminals 62 and 63 thereof, and are converted into the original video signal and audio signal through the process opposite to that during the recording.

By the concept similar to the above, even when the two magnetic heads are respectively replaced by two magnetic head pairs, similar effects obtainable by the above construction may also be obtained, and depending on cases, the cylinder rotating speed may be reduced to half that in the present invention.

Moreover, in the case where the relative speed of the rotary cylinder is set at N/M per one field, with N and M set as natural numbers, similar effect may also be obtained.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A high definition color video signal and audio signal magnetic recording/reproducing apparatus for recording/reproducing a high-definition color video signal and an audio signal on a magnetic tape, said recording/reproducing apparatus comprising:

processing means for receiving and processing said high-definition color video signal and said audio signal and for generating four outputs for each of said processed high-definition color video signal and said processed audio signal, memory means for storing and outputting said four outputs for each of said high-definition color video signal and said audio signal, a rotary cylinder having only two magnetic heads mounted in a symmetrical relation with respect to a rotational center, said rotary cylinder being wound with the magnetic tape through approximately 350°, a rotary cylinder drive circuit for rotating the rotary cylinder through two rotations during each one field period of said high-definition color video signal, and switcher means for supplying the outputs of the memory means to said two magnetic heads on said rotary cylinder respectively through a change-over switch circuit, whereby said processed high definition color video signal and said processed audio signal are arranged to be recorded and reproduced on said magnetic tape by using four tracks during a one field period.

2. An apparatus as claimed in claim 1, wherein said processing means includes means for converting the high-definition color video signal into a luminance signal and two color difference signals, and means for subjecting said luminance signal to time axis expansion and for subjecting said two color difference signals to time axis compression, and for generating said four outputs for the high-definition video signals.

3. An apparatus as claimed in claim 1, wherein said processing means includes means for subjecting the audio signal to PCM signal processing, and for generating said four outputs for the audio signal.

4. An apparatus as claimed in claim 1, wherein an azimuth angle of the two magnetic heads is the azimuth in the symmetrical relation of 180° with respect to the rotary cylinder rotational center, and different in pair.

5. A high definition color video signal and audio signal magnetic recording/reproducing apparatus for recording/reproducing a high-definition color video signal and an audio signal on a magnetic tape, said recording/reproducing apparatus comprising:

processing means for receiving and processing said high-definition color video signal and said audio signal and for generating four outputs for each of said processed high-definition color video signal and said processed audio signal, memory means for storing and outputting said four outputs for each of said high-definition color video signal and said audio signal, a rotary cylinder having two magnetic heads mounted in a symmetrical relation with respect to a rotational center, said rotary cylinder being wound with the magnetic tape through approximately 350°, a rotary cylinder drive circuit for rotating the rotary cylinder through two rotations during each one field period of said high-definition color video signal, switcher means for supplying the outputs of the memory means to said two magnetic heads on said rotary cylinder respectively through a change-over switch circuit, and tape feeding speed variable means for varying the rotating speed of a capstan motor which, in turn, varies the speed of said magnetic tape in a plurality of modes in order to vary the width of a recording track formed by said two magnetic heads, whereby said high-definition color video signal and said audio signal are recorded in a different part of a recorded track on said magnetic tape.

6. An apparatus as claimed in claim 5, wherein said processing means includes means for converting the high-definition color video signal into a luminance signal and two color difference signals, and means for subjecting said luminance signal to time axis expansion and for subjecting said two color difference signals to time axis compression, and for generating said four outputs for the high-definition video signals.

7. An apparatus as claimed in claim 6, wherein said processing means includes means for subjecting the audio signal to PCM signal processing, and for generating said four outputs for the audio signal.

8. An apparatus as claimed in claim 5, wherein an azimuth angle of the two magnetic heads is the azimuth different with respect to the rotary cylinder rotational center.

9. An apparatus as claimed in claim 5, wherein said tape feeding speed variable means, by varying the rotating speed of the capstan motor, varies the tape feeding speed to a standard tape feeding speed, and a tape feeding speed of ½ or ⅓ of said standard tape feeding speed.

10. An apparatus as claimed in claim 7, further comprising a memory control circuit for controlling timing between said memory means output and said switcher means so that a predetermined time axis expansion and compression video signal is recorded in a track neighboring a different track where a closely correlated time axis expansion and compression video signal is recorded.

* * * * *